June 3, 1941. W. M. SCOTT, JR 2,244,086
CIRCUIT BREAKER CONTROL SYSTEM
Filed Dec. 21, 1939
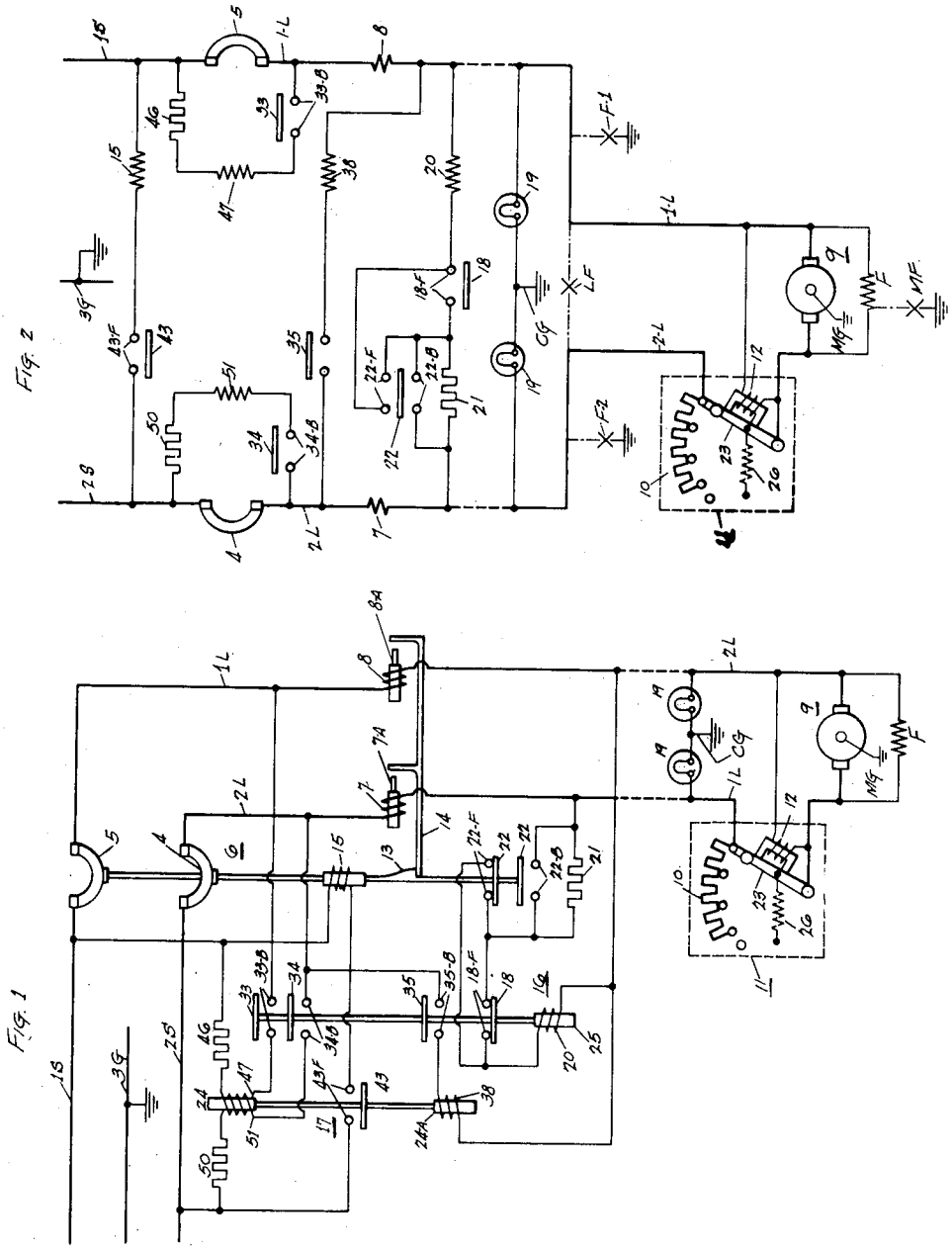
INVENTOR.
William M. Scott, Jr.
BY Cornelius D. Ehret
ATTORNEY.

Patented June 3, 1941

2,244,086

UNITED STATES PATENT OFFICE 2,244,086

CIRCUIT BREAKER CONTROL SYSTEM

William M. Scott, Jr., Bryn Mawr, Pa., assignor to I-T-E Circuit Breaker Company, Philadelphia, Pa., a corporation of Pennsylvania Application December 21, 1939, Serial No. 310,309

19 Claims. (Cl. 175—294)

My invention relates to control systems, and particularly to systems for controlling the tripping and reclosure of circuit breakers.

In accordance with one aspect of my invention, before reclosure of a circuit breaker normally connecting a load circuit to a supply circuit, the load circuit is automatically checked for line-to-line and line-to-ground faults, and if any such fault then exists the circuit breaker is not reclosed, as by automatic reclosing apparatus which is otherwise operative to restore service by reclosure of the circuit breaker; more particularly, upon tripping of the circuit breaker, a reduced voltage, preferably derived from the aforesaid supply circuit, is automatically applied to the load circuit and during application of such reduced voltage, the impedance between the load-circuit conductors, and/or between earth and the individual load-circuit conductors, is automatically checked as to magnitude, as by a relay system, which effects reclosure of the breaker if the check indicates the magnitude or magnitudes of said impedances or either of them are or is not too low.

In accordance with another aspect of my invention, when the load circuit is of such character that upon its disconnection from the supply circuit there exists or is produced a decadent voltage, reclosure of the circuit breaker is controlled by a relay, or equivalent, constructed or adjusted to respond to a predetermined low magnitude of said decadent voltage, so to afford an interval, of greater or lesser duration, between opening and subsequent automatic reclosure of the circuit breaker; more particularly, aforesaid application of reduced voltage to the load circuit and checking of the load circuit impedances is delayed, after opening of the circuit breaker, until the decadent voltage produced in the load circuit by reactances, motors or the like, has fallen to or beyond a predetermined low magnitude to which aforesaid relay or equivalent responds.

My invention further resides in control systems having the features of combination and arrangement hereinafter described and claimed.

For an understanding of my invention, reference is made to the accompanying drawing, in which:

Fig. 1 diagrammatically represents a circuit breaker control system; and

Fig. 2 is an across-the-line diagram of Fig. 1.

Referring to Figs. 1 and 2, the circuit breaker 6, which normally connects the conductors 1L, 2L of the load circuit to the supply conductors 1S, 2S, is of the multi-pole type; its movable or bridging contacts 4, 5 are normally held in closed circuit position by latch 14 controlled by the armatures 7A, 8A, of trip coils or magnets 7 and 8 disposed, respectively, in the load circuit conductors 2L, 1L.

Whenever the current in either or both of the load-circuit conductors exceeds a magnitude, predetermined by adjustment or construction of the tripping devices including coils 7, 8, the latch 14 is withdrawn from the abutment 13, whereupon the circuit breaker is opened by gravity and/or biasing means, such as a spring, not shown, to disconnect load-circuit conductors 1L, 2L from the corresponding supply conductors 1S, 2S.

For explanation of my invention and not as limitative of its applications, the supply circuit is shown as including a grounded neutral conductor 3G, the load circuit may be grounded at CG between constant load devices generically represented by lamps 19, and the frame of motor 9 in the load circuit may be grounded at MG. The motor 9, shown as a direct-current motor, is shown equipped with a manually operable starting box 11 of usual type having a resistance 10 adjustable step-by-step by movement of contact arm 23 held in running position by the under-voltage release coil or magnet 12.

Under any one or more of the following circumstances, the circuit breaker is tripped open by excessive current through one or both of coils 7, 8; occurrence of a fault (F1) from load conductor 1L to ground causing excessive current through tripping coil 8; occurrence of fault (F2) from load conductor 2L to ground causing excessive current through tripping coil 7; occurrence of a fault (LF) between the load-circuit conductors 1L, 2L causing excessive current through both of the tripping coils 7, 8; occurrence of a fault (MF) between ground and any field winding, such as F, of motor 9 causing excessive current in one or both of the tripping coils depending upon the location of the fault and whether or not the starting resistance 10 or equivalent is in or out of circuit (Fig. 2); occurrence of overloading of motor 9 sufficiently excessive to raise the current through coils 7 and 8 to tripping magnitude.

If the overload is a temporary one, due, for example, to excessive demands upon the motor 9, or to a temporary fault between the load conductors or either of them and ground, it is desirable that service be promptly and automatically restored to the load circuit by reclosure of the circuit breaker after the fault has been eliminated; but if the fault is not transient, it is desirable that the circuit breaker be not reclosed so long as the fault exists.

In the arrangement shown, energization of coil 15, exemplary of any suitable motive device for causing or effecting reclosure of the circuit breaker, is controlled by a system or device which in effect, after opening of the circuit breaker, checks the impedance between the load circuit conductors, and the impedance between earth and each of the load circuit conductors, to the end that if any of these impedances is not sufficiently high to indicate absence of faults, the coil 15 is not energized and the circuit breaker remains open; if, on the other hand, the check of these impedances indicates the load-circuit conditions are not unusual or abnormal, the closing coil 15 of the breaker is energized promptly to restore service to the load circuit.

The checking of the line-to-line and line-to-ground impedances of the load circuit is effected at low voltage which is conveniently and preferably derived from the service line 1S, 2S which may, or may not, include a grounded neutral 3G; specifically, upon tripping of the circuit breaker, energization of the load circuit is continued but through current-limiting impedance. In the particular system shown, opening of contact 5 of the circuit breaker 6 removes a shunt of negligible resistance from across a branch circuit comprising in series the voltage-dropping resistor or impedance 46, current coil 47 of relay 17, and the contact 33 of relay 16. When the circuit breaker contact 5 is open and the relay contact 33 closed, the service conductor 1S is connected to the load circuit conductor 1L through the voltage-dropping resistance 46. Similarly, when the circuit breaker contact 4 is open, the service conductor 2S is connected to the load conductor 2L through the voltage-dropping resistance or impedance 50, the current-coil 51 of relay 17, and the contact 34 of relay 16. Thus, upon opening of the circuit breaker, a test voltage, (the line voltage minus the voltage drops across the current-limiting impedances 46, 50), is impressed upon the load circuit.

If the currents through the current-coils 47, 51 of relay 17, respectively now included in the load conductors 1L, 2L, are substantially equal, or produce substantially equal effects upon the armature 24 of the relay, their net effect upon the armature structure of the relay 17 is zero or of inappreciable magnitude because the coils are connected or wound differentially to affect the armature 24; if the currents through the coils 47, 51 are of substantially different magnitudes because of existence of a fault between earth and one of the conductors 1L, 2L, the resultant or differential effect of the coils upon the armature structure of the relay, by opposing the effect of coil 38 upon the second armature 24A, prevents closure of its contact 43 which controls the circuit of the closing coil 15 of the circuit breaker.

Assuming that the currents through the load-circuit conductors are substantially balanced during the application of reduced voltage to the load circuit, whether or not the relay 17 effects closure of the circuit of the closing coil 15 of the circuit breaker depends upon the sufficiency of energization of the voltage coil 38 of relay 17 which, when the circuit breaker is open, is connected across the load-circuit conductors; if the impedance is sufficiently high between the conductors 1L, 2L, the energization of coil 38 is sufficient to actuate the relay armature and effect closure of the relay contact 43. On the other hand, if the line-to-line impedance is normal or sufficiently high to effect energization of coil 38 to extent otherwise sufficient to close the contacts of relay 17, but the currents through the line conductors 1L, 2L are not balanced or sufficiently nearly so, the unbalanced effect of coils 47 and 51 upon armature 24 opposes the effect of coil 38 upon armature 24A and so precludes actuation of the relay contact 43 necessary for reclosure of the circuit breaker.

Preferably the energization of the coils of relay 17 is not effected immediately upon opening of the circuit breaker 6; energization thereof is delayed to avoid complications arising because of existence in the load circuit upon opening of the circuit breaker of a decadent voltage due, for example, to the inductive or capacity effects, or, and particularly in the system shown in the drawing, due to the generator effect of motor 9 existent during deceleration of the motor armature after opening of the circuit breaker.

In the preferred arrangement shown, this delay is procured by relay 16 whose coil 20 is normally connected between the load circuit conductors 1L, 2L in series with the voltage-dropping resistor 21. Under normal circuit conditions with the circuit breaker closed, the coil 20 of relay 16 is energized to maintain open the circuits of the coils of the impedance-checking relay 17; when the circuit breaker 6 opens, its auxiliary contact structure 22 by engagement with stationary contacts 22B shunts the voltage-dropping resistor 21 in effect to change the calibration of the relay 16 so that its coil 20 is sufficiently energized at now materially lower test voltage between conductors 1L, 2L to maintain its aforesaid contacts 33, 34 and 35 in their open-circuit positions. When, after opening of the circuit breaker, the magnitude of aforesaid decadent generator voltage in the load circuit falls to a sufficiently low magnitude, the energization of coil 20 of relay 16 is no longer sufficient to hold up armature 25, whereupon the contacts 33, 34 and 35 are actuated by the biasing means, not shown, of the relay to their closed-circuit positions, to effect, as above described, energization of the voltage and current coils of the relay 17.

When the magnitude of the decadent voltage is so low the coil 20 is incapable of resisting aforesaid armature biasing means, the contact 18 moves from engagement with contacts 18F, and so opens the circuit of coil 20; this coil circuit cannot be reclosed except by reclosure of the circuit breaker 6 whose auxiliary contact structure 22, as hereinafter described, again brings coil 20 into circuit.

So long as relay 16 remains deenergized, its contacts 33 and 34 remain closed to continue energization of the current-coils 47, 51 of relay 17 by the test currents in the load-circuit conductors 1L, 2L and contact 35 of relay 16 remains closed for energization of the voltage-coil 38 of relay 17 by test current.

If the impedance between lines 1L, 2L is too low, as because of a fault (LF), the coil 38 of relay 17 is energized insufficiently to effect movement of the relay contact 43 to its circuit-closing position and, therefore, regardless of whether or not additional fault or faults exist, as from earth to either of conductors 2L, 1L, the circuit breaker is not reclosed: if a fault, such as F1, F2, or MF exists from earth to either of the load-circuit conductors, the contact-closing effect of coil 38 is overcome by the unbalanced differential effect of the current coils 47, 51, again with the result that the contact 43 of relay 17 is not closed and the circuit breaker 6 therefore cannot be reclosed and so remains open.

If, on the contrary, the load circuit is free of, or has been cleared of, all faults, the coil 38 of relay 17 is effective to move contact 43 to its closed-circuit position to energize the reclosing coil 15 of the circuit breaker.

The main contacts 4, 5 of the circuit breaker, upon their resulting movement to closed-circuit position, shunt the voltage-dropping resistors 46 and 50, respectively, and so restore full-line voltage to the load circuit; concurrently with this movement of the main contacts 4, 5, auxiliary contact structure 22 moves into engagement with the cooperating stationary contacts 22F to reconnect coil 20 across the load-circuit conductors 1L, 2L in series with the resistance 21. The reenergization of said coil 20 of relay 16 effects circuit-opening movement of the contacts 33, 34 and 35 of the relay and so effects disconnection of all the coils of relay 17 from the load circuit until the circuit breaker is again tripped or opened; the reenergization of coil 20 of relay 16 also effects reclosure of the lock-in contacts 18, 18F of the relay to prevent its deenergization when auxiliary contact structure 22 of the circuit breaker moves from engagement with contacts 22F for engagement with contacts 22B.

The reclosure of circuit breaker 6 is automatic and prompt if any fault or cause of its tripping has disappeared by the time relay 16 is energized; if the tripping of the breaker occurs because of a line-to-ground fault, service is not entirely interrupted because the test voltage may be sufficiently high to afford some illumination by lamp or lamps 19, a feature of visibility important in mine installations; and, in any case, the circuit breaker automatically recloses when the fault is located and removed, because of the continuous monitoring afforded by relay 17. Upon reclosure of the breaker, the motor 9 does not start because the voltage at which coil 12 of its starting box releases the handle 23, for its return by biasing spring 26 to the end or dead contact of the starting box, is suitably higher than that voltage at which relay 16 drops out when the series resistance 21 is shunted by auxiliary contact 22 of the circuit breaker.

What I claim is:

1. In combination with a system comprising a supply circuit, a load circuit, a circuit breaker for interconnecting said circuits, and automatic means for reclosing said circuit breaker, of means for automatically checking said load circuit for fault impedance prior to reclosure of said circuit breaker comprising means for deriving from said supply circuit and impressing upon said load circuit while said circuit breaker is open a reduced voltage, and means having a plurality of windings, responsive to comparison with each other of the magnitudes of currents traversing said load circuit conductors upon impression of said reduced voltage, for controlling said circuit breaker reclosing means.

2. In a system comprising a load circuit, a supply circuit, and a circuit breaker for connecting said circuits, means effective upon opening of said circuit breaker to apply reduced voltage to said load circuit, means having a plurality of windings for comparing with respect to each other the magnitudes of currents traversing the conductors of said load circuit while subjected to said reduced voltage, and means for reclosing said circuit breaker controlled by said current-comparing means.

3. In a system comprising a load circuit, a supply circuit, and a circuit breaker for connecting said circuits, means effective upon opening of said circuit breaker to apply reduced voltage to said load circuit, means having a plurality of windings responsive during application of said reduced voltage to the voltage difference between conductors of said load circuit and to unbalance of the currents traversing them, and means for reclosing said circuit breaker controlled by said responsive means.

4. In a system comprising a supply circuit, a circuit breaker, and a load circuit normally connected by said circuit breaker to said supply circuit and producing a decadent voltage upon opening of said circuit breaker, means responsive to said decadent voltage, means having a plurality of windings controlled by said responsive means to compare with respect to each other the relative magnitudes of currents traversing conductors of said load circuit, and means for reclosing said circuit breaker controlled by said current-comparing means.

5. In a system comprising a supply circuit, a circuit breaker, and a load circuit normally connected by said circuit breaker to said supply circuit and producing a decadent voltage upon opening of said circuit breaker, relay means responsive to predetermined low magnitude of said decadent voltage to apply to said load circuit a reduced voltage derived from said supply circuit, means having a plurality of windings for comparing with respect to each other the magnitudes of currents traversing conductors of said load circuit while subjected to said reduced voltage, and means for reclosing said circuit breaker controlled by said current-comparing means.

6. In a system comprising a supply circuit, a circuit breaker, and a load circuit normally connected by said circuit breaker to said supply circuit and producing a decadent voltage upon opening of said circuit breaker, relay means responsive to predetermined low magnitude of said decadent voltage to apply to said load circuit a reduced voltage derived from said supply circuit, means having a plurality of windings responsive during application of said reduced voltage to the voltage difference between conductors of said load circuit and to the relative magnitude of the currents traversing them, and means for reclosing said circuit breaker controlled by said responsive means.

7. In a system comprising a supply circuit, a circuit breaker having auxiliary contact structure, and a load circuit normally connected by said circuit breaker to said supply circuit and producing a decadent voltage upon opening of said circuit breaker, means energizable to reclose said circuit breaker, a relay for controlling said energizable means connected across said load circuit for response to predetermined low magnitude of said decadent voltage, and resistance in series with said relay shunted by said auxiliary contact structure when said circuit breaker is open.

8. In a system comprising a supply circuit, a circuit breaker, and a load circuit normally connected by said circuit breaker to said supply circuit and producing a decadent voltage upon disconnection from said supply circuit of said load circuit by opening of said circuit breaker, means energizable to reclose said circuit breaker, and a relay responsive to predetermined low magnitude of said decadent voltage substantially concurrently to effect energization of said reclosing means and deenergization of the relay.

9. In a system comprising a supply circuit, a circuit breaker, and a load circuit normally connected by said circuit breaker to said supply circuit and producing a decadent voltage upon opening of said circuit breaker, means energizable to reclose said circuit breaker, a relay for controlling said energizable means and responsive to predetermined low magnitude of said decadent voltage, contact structure actuated upon opening of said circuit breaker to effect energization of said relay by said decadent voltage, and contact structure actuated upon response of said relay to said predetermined low magnitude of said voltage to effect deenergization of said relay until said circuit breaker is reclosed.

10. In a system comprising a load circuit, a supply circuit, and a circuit breaker for connecting said circuits, means energizable to effect closure of said circuit breaker, a relay including movable contact structure for controlling energization of said closing means and voltage and current coils for producing opposing forces whose resultant determines the position of said contact structure, a second relay having contacts for connecting the coils of said first relay to said load circuit, and contact structure operable upon opening of said circuit breaker to effect energization of said second relay.

11. In a system comprising a load circuit, a supply circuit therefor, and a multi-pole circuit breaker for normally connecting said circuits, a plurality of circuits each normally shunted by the corresponding movable contact structure of a pole of the circuit breaker and each comprising a current coil of a relay and contact structure of a second relay, means energizable to close said circuit breaker controlled by contact structure of said first relay, and contact structure effective upon opening of said circuit breaker to permit energization of said second relay.

12. In a system comprising a load circuit, a supply circuit therefor, and a multi-pole circuit breaker for normally connecting said circuits, a plurality of circuits each normally shunted by the corresponding movable contact structure of a pole of the circuit breaker and each comprising a current coil of a relay and contact structure of a second relay, means energizable to close said circuit breaker controlled by contact structure of said one relay, a voltage coil for said first relay controlled by contact structure of said second relay for energization from said load circuit subsequent to movement of the movable contact structures of said circuit breaker to their non-shunting positions.

13. In a system comprising a load circuit, having ungrounded conductors, a supply circuit, and a circuit breaker for connecting said circuits, means energizable to close said circuit breaker, means effective upon opening of said circuit breaker to apply reduced voltage to said load circuit, a connection to earth from at least one of said circuits, and means for controlling the energization of said closing means effective during said application of reduced voltage to said load circuit to detect faults between earth and any of said ungrounded conductors of the load circuit.

14. In a system comprising a load circuit having ungrounded conductors, a supply circuit, and a circuit breaker for connecting said circuits, means energizable to close said circuit breaker, means effective upon opening of said circuit breaker to apply reduced voltage to said load circuit, a connection to earth from at least one of said circuits, and means for controlling the energization of said closing means effective during said application of reduced voltage to said load circuit to detect faults between different conductors of said load circuit and between any of said ungrounded conductors and earth.

15. In a system comprising a supply circuit having ungrounded conductors, a circuit breaker, and a load circuit normally connected by said circuit breaker to said supply circuit and producing a decadent voltage upon opening of said circuit breaker, means energizable to close said circuit breaker, means responsive to predetermined low magnitude of said decadent voltage to apply to said load circuit a reduced voltage, a connection to ground from at least one of said circuits, and means for controlling the energization of said closing means effective during said application of reduced voltage to said load circuit to check the line-to-line impedance and the line-to-ground impedance of said load circuit.

16. A system comprising a supply circuit having a plurality of ungrounded conductors, a ground connection for said system, a load circuit having a plurality of ungrounded conductors, a circuit breaker normally connecting said supply and load circuits, closing means for said circuit breaker, means for releasing said circuit breaker responsive to the current flowing in any of said conductors, test circuits, means responsive to the voltage of the load circuit upon opening of said circuit breaker subsequently to effect connection of said load circuit to said test circuits and plural winding means for controlling said closing means responsive to relative values of the test currents flowing in said load conductors.

17. A system comprising a supply circuit having a plurality of ungrounded conductors, a ground connection for said system, a load circuit having a plurality of ungrounded conductors, a circuit breaker normally connecting said supply and load circuits, release means for said circuit breaker responsive to the current flowing in one of said conductors, closing means for said circuit breaker, test circuits, means for connecting said load circuit to said test circuits after said circuit breaker is open, and plural winding means responsive to the relative values of the test currents flowing in said load conductors for controlling said closing means, said connecting means controlled in accordance with the potential of said load circuit.

18. A system comprising a supply circuit having a plurality of ungrounded conductors, a ground connection for said system, a load circuit, a circuit breaker normally connecting said supply and load circuits, release means for said circuit breaker responsive to the current flowing in any of said conductors, closing means for said circuit breaker, test circuits, means for connecting said load circuit to said test circuits when said circuit breaker is open, and plural winding means for controlling said closing means responsive to unbalance of forces related respectively to the sum and difference of the values of the test currents flowing in said load conductors.

19. A system comprising a supply circuit having a plurality of conductors, a load circuit, a circuit breaker normally connecting said load and supply circuits, test circuits, closing means for said circuit breaker, means for connecting said load circuit to said test circuits when said circuit breaker is open, and plural winding means responsive to unbalance of the test currents flowing in said load conductors for controlling said closing means.

WILLIAM M. SCOTT, Jr.